April 23, 1935.  A. G. HETZER  1,998,871
ICE CREAM FREEZER
Filed Sept. 6, 1934  3 Sheets-Sheet 1
Fig. 1.
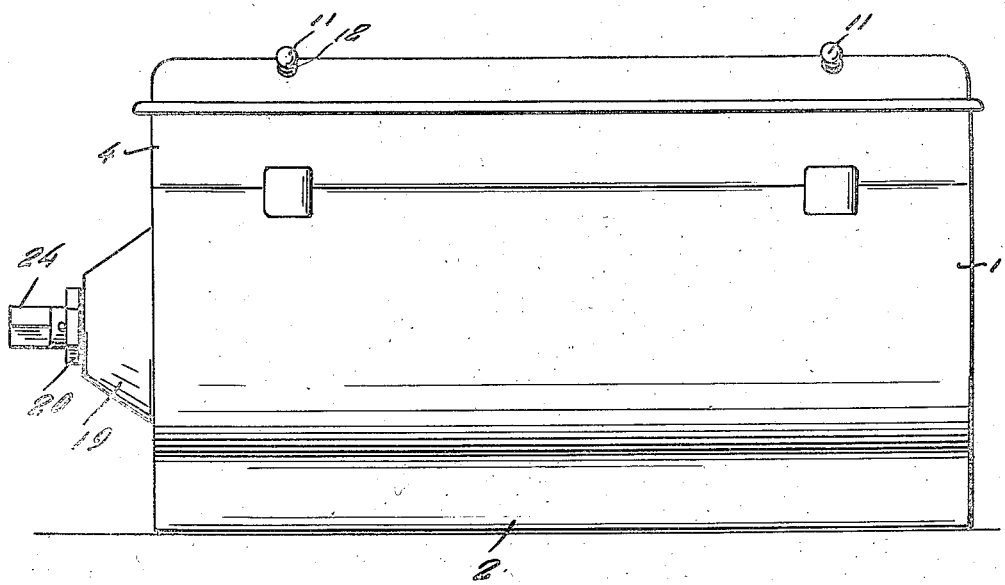
Fig. 6.
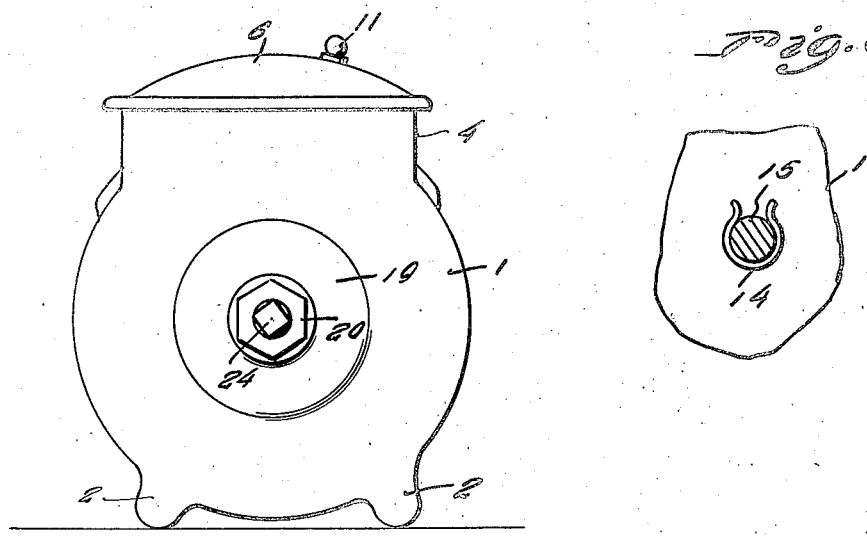
Fig. 5.
Inventor
A. G. Hetzer
By Clarence A. O'Brien
Attorney April 23, 1935.  A. G. HETZER  1,998,871
ICE CREAM FREEZER
Filed Sept. 6, 1934  3 Sheets-Sheet 2
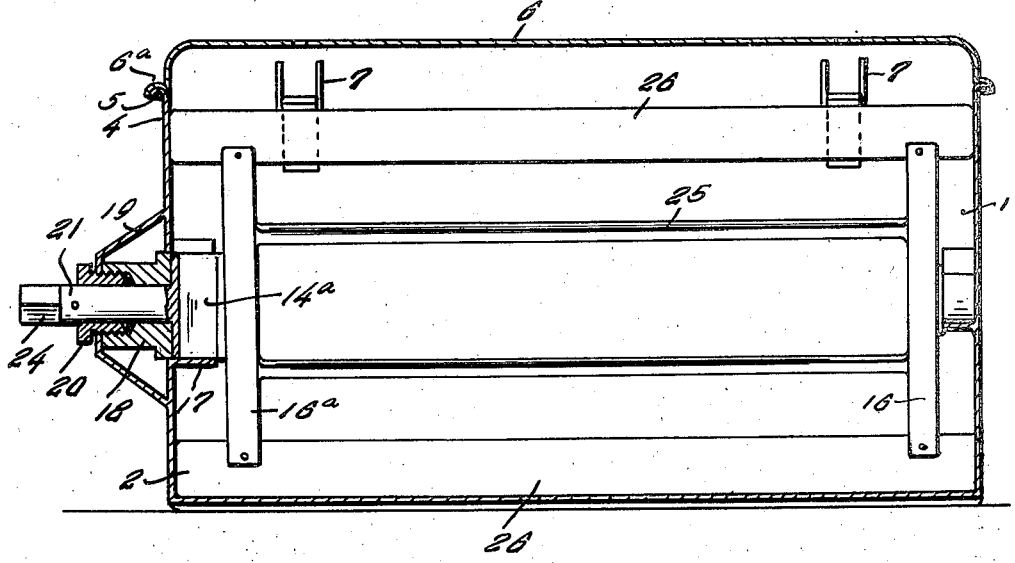
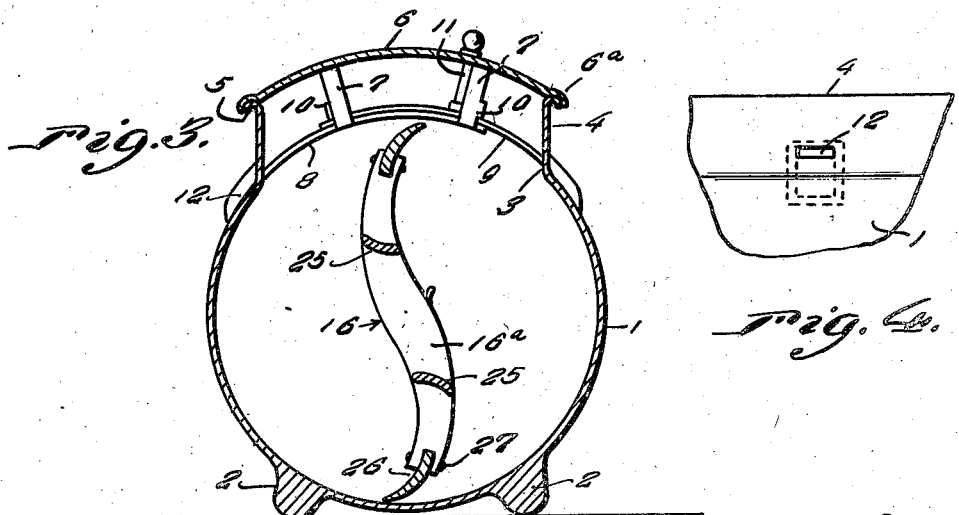
Inventor
A. G. Hetzer
By Clarence A. O'Brien
Attorney Patented Apr. 23, 1935

1,998,871

UNITED STATES PATENT OFFICE 1,998,871

ICE CREAM FREEZER

Albert G. Hetzer, Rush, N. Y.

Application September 6, 1934, Serial No. 743,014

3 Claims. (Cl. 220—57)

This invention relates to an ice cream freezer and has for its object the provision of such a freezer which may be used for freezing desserts in an electrical refrigerator or the like.

Further, in accordance with the present invention, a freezer of the character above mentioned is provided with improved means for stirring the contents of the freezer without necessitating removal of the freezer from the freezing chamber of the electric refrigerator.

The invention, together with its objects and advantages will be best understood from a study of the following description taken in connection with the accompanying drawings wherein:

Figure 1 is a side elevational view of the freezer.

Figure 2 is a longitudinal sectional view therethrough.

Figure 3 is a transverse sectional view through the freezer.

Figure 4 is a fragmentary detail elevational view showing a latch recess provided in a wall of the freezer.

Figure 5 is an end elevational view of the freezer.

Figure 6 is a fragmentary detail view showing the bearing for the pintle on one end of the stirrer or agitator.

Figure 7:
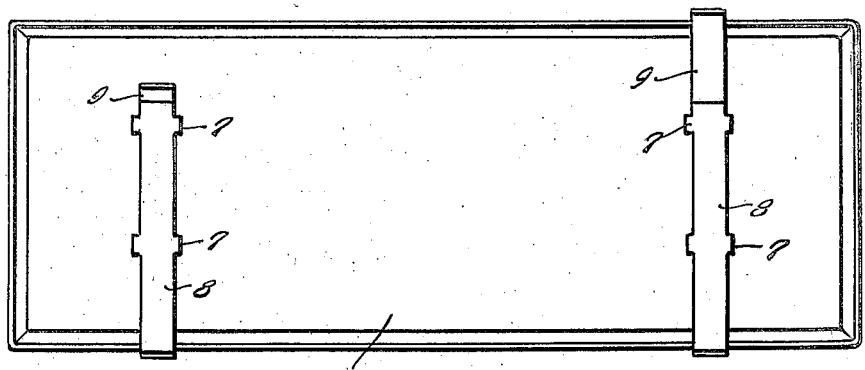
Figure 7 is a bottom plan view of the cover for the freezer.

Referring to the drawings by reference numerals, it will be seen that the freezer comprises a relatively shallow tray or pan 1 that is substantially cylindrical in cross section and is provided on its bottom with integral longitudinally extending supporting legs 2 whereby the tray may be set down on a flat support or surface without danger of rotating towards one or the other side thereof.

In its top the pan or tray 1 is provided with an elongated opening 3 surrounded by an upstanding flange 4 integral with the wall of the pan or tray. At the upper edge thereof the flange 4 is rolled to provide a bead 5.

For the top of the tray or pan 1 there is provided, in the present instance, a transversely curved cover 6 the edges of which are rolled as at 6a to provide grooves having sliding contact with the bead 5 as shown in Figure 3.

Adjacent each end thereof, the cover 6 is provided on its under side with pairs of opposed brackets 7 spaced transversely of the cover and arranged to extend inwardly within the confines of the flange 4 as shown in Figure 3. The brackets 7 are formed of metal or other suitable material and at their inner ends are integral with a longitudinally curved or bowed spring, fixed latch member 8, there being one latch member 8 associated with each pair of brackets 7.

Slidably engaged with the latch members 8 are longitudinally curved spring latch members 9 which operate between opposed members of the brackets 7 and which are held in sliding contact with the members 8 through the medium of inturned extensions 10 provided on the side members of the brackets 7 as shown in Figure 3. For manipulating the spring latch members 9 the same are provided with knob equipped pins 11 that operate in transverse slots 12 provided in the top 6.

Figure 8:
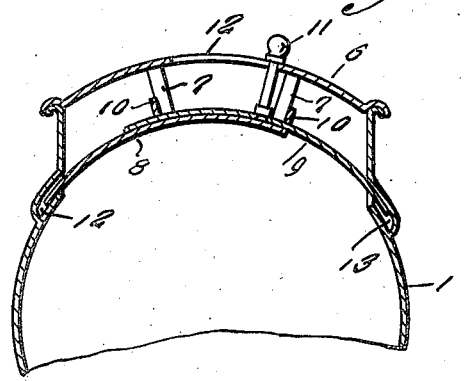
Figure 8 is a fragmentary detail sectional view through the freezer and cover showing the manner of releasably securing the cover to the freezer.
Figure 9:
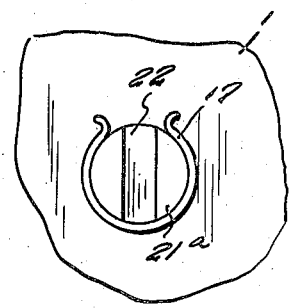
Figure 9 is a view somewhat similar to Figure 6 showing a bearing and a stub shaft having a head journaled in the bearing.
Figure 10:
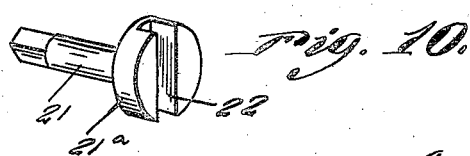
Figure 10 is a perspective view of the stub shaft forming the coupling between the stirrer and the handle therefor.

For receiving the free ends of the spring latch members 9 the box or tray 1 at one side thereof, and at the junction of the peripheral wall of the tray with the flange 4 is provided with hollow formations forming pockets 12 opening inwardly of the container through the flange 4 in a manner to receive the free ends of the spring latch members 8 as clearly shown in Figure 8.

To receive the free ends of the spring latch members 9 the tray 1 is provided on the opposite side thereof in a similar manner to provide sockets 13 into which one end of the latch members 9 are projected, subsequent to an engagement of the latch members 8 with the sockets 12, by shifting the pins 11 to the position shown in Figure 8, thereby securely retaining the cover in place.

On one end wall thereof, the tray or pan 1 is provided internally with a bearing 14 adapted to receive the pintle 15 on one end of an agitator or stirrer indicated generally by the reference numeral 16.

On the other end wall thereof the tray or container 1 as best shown in Figure 2 is provided internally with a bearing 17 and with which is alined a boxing 18 extending from the outer side of the end wall of the tray and substantially concealed by a reinforcing substantially conical structure 19. The boxing 18 is provided with a suitable gland 20.

A stub shaft 21 extends through the boxing 18 and gland 20 and on its inner end is provided with a circular or disk-like head 21a that is journaled in the bearing 17, and is provided with a slot 22 to receive an oblong diagonal pintle 14a provided at a second end of the stirrer or agitator 16. On its outer end, the stub shaft 21 is squared as at 24 to facilitate connection therewith of a handle for rotating the stirrer 16.

The stirrer 16 comprises a pair of end members 16a to which the pintles 14 and 14a are secured. End members 16a are connected by agitator blades 25 that are transversely curved and which are connected in any suitable manner to the reversely curved end portions of the members 16a of the stirrer.

At the ends thereof, the members 16a of the stirrer are notched to accommodate wiping blades 26 that are also transversely curved and which are secured to the members 16a of the stirrer as at 27. The leading edges of the blades 26 have wiping engagement with the peripheral wall of the container 1 and serve to wipe the fluid contents of the container from the walls thereof and to direct such contents inwardly towards the center of the stirrer to be agitated by the blades 25 thereof.

What is claimed is:

1. In a device of the character described, a tray member having sides provided with sockets opening inwardly thereof, a cover for the tray having on the inner side thereof fixed transverse members having ends extending outwardly beyond one edge of the cover to engage in sockets in one side of the tray, latch members slidably engaged with said fixed members and adapted to be projected beyond the opposite edge of the cover to engage sockets in the side of the tray opposite to the first named sockets, and finger pieces connected with the latch members for projecting and retracting them.

2. In a device of the character described, a tray having opposed sides each of which is provided with spaced sockets, a cover for said tray, fixed members on the inner side of the cover having ends to engage the sockets in one side of the tray, other members slidably engaged with the first named members and having ends adapted to be projected into engagement with the sockets at the opposite side of the tray, and finger pieces secured to the slidable members and projecting through slots in said cover.

3. In a device of the character described, a tray having opposed sides each of which is provided with spaced sockets, a cover for said tray, fixed members on the inner side of the cover having ends to engage the sockets in one side of the tray other members slidably engaged with the first named members and having ends adapted to be projected into engagement with the sockets at the opposite side of the tray, and finger pieces secured to the slidable members and projecting through slots in said cover, spaced strap members securing said fixed members to the cover in spaced relation thereto, and between which said slidable members operate, and means on said strap members overlying the fixed members and between which and said fixed member said slidable members are constrained to reciprocate.

ALBERT G. HETZER.